(12) United States Patent
Kohl et al.

(10) Patent No.: US 11,220,084 B2
(45) Date of Patent: Jan. 11, 2022

(54) FLUID LINE

(71) Applicant: NORMA Germany GmbH, Maintal (DE)

(72) Inventors: Carolin Kohl, Bruchköbel (DE); Christoph Steinkamp, Biebergemünd (DE); Andreas Bauer, Obernburg (DE); David Schoumacher, Schoeneck (FR); Olivier Piovesan, Moutiers (FR)

(73) Assignee: Norma Germany GmbH, Maintal (DE)

( * ) Notice: Subject to any disclaimer, the term of this patent is extended or adjusted under 35 U.S.C. 154(b) by 0 days.

(21) Appl. No.: 17/259,305

(22) PCT Filed: Jun. 18, 2019

(86) PCT No.: PCT/EP2019/066103
§ 371 (c)(1),
(2) Date: Jan. 11, 2021

(87) PCT Pub. No.: WO2020/011500
PCT Pub. Date: Jan. 16, 2020

(65) Prior Publication Data
US 2021/0252822 A1 Aug. 19, 2021

(30) Foreign Application Priority Data
Jul. 9, 2018 (DE) .................. 10 2018 116 567.6

(51) Int. Cl.
*B32B 1/08* (2006.01)
*B32B 27/08* (2006.01)
(Continued)

(52) U.S. Cl.
CPC ................ *B32B 1/08* (2013.01); *B32B 27/08* (2013.01); *B32B 27/20* (2013.01); *B32B 27/34* (2013.01);
(Continued)

(58) Field of Classification Search
CPC ........... B32B 1/08; B32B 27/08; B32B 27/20; B32B 27/34; B32B 2250/05;
(Continued)

(56) References Cited

U.S. PATENT DOCUMENTS 8,101,255 B2 1/2012 Defilippi et al.
9,534,712 B2 1/2017 Zimmer et al.
(Continued)

FOREIGN PATENT DOCUMENTS

EP 2066494 B1 8/2010
EP 3192650 A1 7/2017
(Continued)

OTHER PUBLICATIONS

German Office Action for German Application No. 10 2018 116 567.6 dated Feb. 1, 2019 (5 pages).
(Continued)

*Primary Examiner* — Michael C Miggins
(74) *Attorney, Agent, or Firm* — Reising Ethington, P.C.

(57) ABSTRACT

A fluid line includes a pipe of a multilayered plastics material. The pipe surrounds an interior space. The pipe has an inner, first layer of polyamide 9T (PA9T), a second layer of polyamide 12 (PA12), a third layer of polyamide 612 (PA612), a fourth layer of polyamide 6 (PA6) and an outer, fifth layer of polyamide 612 (PA612). The inner, first layer bounds the interior space. A fluid line that has a reduced (Continued)

dissolution of material, a reduced permeability to volatile substances, and nevertheless maintains sufficient mechanical properties for a connection to other components of a line, is hence provided.

17 Claims, 1 Drawing Sheet

(51) Int. Cl.
  *B32B 27/20* (2006.01)
  *B32B 27/34* (2006.01)
(52) U.S. Cl.
  CPC ....... *B32B 2250/05* (2013.01); *B32B 2250/24* (2013.01); *B32B 2307/4026* (2013.01); *B32B 2307/714* (2013.01); *B32B 2307/7265* (2013.01); *B32B 2307/732* (2013.01); *B32B 2597/00* (2013.01); *B32B 2605/00* (2013.01)
(58) Field of Classification Search
  CPC ........ B32B 2250/24; B32B 2307/4026; B32B 2307/714; B32B 2307/7265; B32B 2307/732; B32B 2597/00; B32B 2605/00
  See application file for complete search history.

(56) References Cited

U.S. PATENT DOCUMENTS

| 10,663,092 | B2 | 5/2020 | Nakamura et al. |
| 2008/0014397 | A1 | 1/2008 | Manai et al. |
| 2009/0297749 | A1 | 12/2009 | Sato |
| 2010/0009107 | A1* | 1/2010 | Defilippi ................ B32B 27/34 |
| | | | 428/36.91 |
| 2018/0080583 | A1 | 3/2018 | Montanari et al. |

FOREIGN PATENT DOCUMENTS

| EP | 2772354 B1 | 12/2018 |
| WO | WO2017121961 A1 | 7/2017 |

OTHER PUBLICATIONS

Written Opinion and International Search Report for International Application No. PCT/EP2019/066103 dated Oct. 4, 2019 (8 pages).
English Translation of Written Opinion and International Search Report for International Application No. PCT/EP2019/066103 dated Oct. 4, 2019 (6 pages).

* cited by examiner

FLUID LINE

INTRODUCTION

The disclosure relates generally to a fluid line having a tube composed of a multilayered plastics material.

Lines for transferring chemically active fluids, e.g., fuels in vehicles, typically should satisfy specific requirements during use. Thus, the material of the line should not be dissolved by the fluid. This should also be avoided at relatively high temperatures. Furthermore, the line should typically be impermeable to the fluid being transferred and to the chemical components thereof to ensure that volatile substances that may be contained in the fluid cannot penetrate through the wall of the line. This is intended, on the one hand, to avoid a reduction in the quality of the fluid being transferred and, on the other hand, to avoid escape of the volatile substances into the environment. Furthermore, leaching should be avoided. This is relevant particularly when the fluid is at rest in the line, i.e. when, at least temporarily, no transfer of the fluid is taking place. Moreover, the lines should have mechanical properties which allow simple and reliable connection of the line to other line components.

EP 2 066 494 B1 discloses a multilayered motor vehicle fuel line having an innermost first layer containing a polyamide resin (nylon 9T), which is formed from a carbonic acid component and a diamine component, a second layer composed of polyamide 6 (PA6), a third layer composed of a co-polyamide (CoPa)-based coupling layer, and an external fourth layer composed of polyamide 12 (PA12).

SUMMARY

It is an object of the disclosure, per an embodiment, to provide a fluid line of the type stated at the outset which exhibits reduced leaching of the materials of the fluid line and reduced permeability for volatile substances and nevertheless has adequate mechanical properties for connection to other components of a line.

In an embodiment, a fluid line having a tube composed of a multilayered plastics material is provided, in which the tube surrounds an interior space, the tube has an inner, first layer composed of polyamide 9T (PA9T), a second layer composed of polyamide 12 (PA12), a third layer composed of polyamide 612 (PA612), a fourth layer composed of polyamide 6 (PA6) and an outer, fifth layer composed of polyamide 612 (PA612). The inner, first layer delimits the interior space.

The disclosure thus provides, per an embodiment, a tube for a fluid line which has a multilayered tube wall. In this arrangement, the tube surrounds an interior space through which the fluid to be transferred is passed. Here, the inner, first layer directly adjoins the interior space and delimits said space. In this case, the inner, first layer is composed of polyamide 9T (PA9T). This material provides a layer which has a low permeability. In this context it forms a barrier to volatile substances in the fluid, e.g. alcohols or certain additives in fuels. Furthermore, the inner, first layer is resistant to chemicals and hydrolysis and absorbs only small quantities of water. Leaching occurs at most to a slight extent. Even at high temperatures, the inner, first layer has good mechanical properties, and it is therefore dimensionally stable. Thus, the inner, first layer forms a barrier for substances escaping from the project, while the barrier nevertheless ensures adequate mechanical stability of the inner wall of the tube.

The second layer composed of polyamide 12 likewise exhibits only slight water absorption, and therefore an additional barrier against escaping water is formed by the second layer. Furthermore, the second layer is mechanically stable and improves the stability of the tube, even at high pressures or in the presence of other mechanical forces.

The polyamide 6 of the fourth layer is readily available and relatively inexpensive. The fourth layer composed of polyamide 6 forms a basic structure for the tube of the fluid line.

The outer, fifth layer composed of polyamide 612 exhibits good media resistance with respect to greases, oils, fuels, hydraulic fluids, water and alkalis. If the fluid line is used in an environment in which these substances can reach the outer layer of the tube, the inner layers are protected by the outer, fifth layer. Thus, the outer, fifth layer forms a protective layer with respect to external influences for the inner layers. Furthermore, the outer, fifth layer is flexible.

By virtue of the combination of the five layers in the tube of the fluid line, per an embodiment, the tube has improved properties for the transfer of fluids that contain volatile substances or aggressive chemical substances, for example, in comparison with the prior art. At the same time, the tube is nevertheless mechanically stable and flexible by virtue of the multilayered plastics material. The individual layers support each other and combine their properties synergistically in such a way that, together with the good chemical resistance, good mechanical properties are also provided to enable the fluid line to be used in various situations that have different requirements. Thus, the mechanical properties allow reliable and simple connection of the fluid line to other components of the line.

The inner, first layer can have a thickness in a range of from 15% to 25%, preferably 20%, of the total wall thickness of the tube. An inner, first layer which has this relative thickness preserves the properties of the inner, first layer in respect of impermeability for substances that may escape from the fluid arranged in the interior space.

The second layer can have a thickness in a range of from 2% to 18%, preferably 10%, relative to the total wall thickness of the tube. The second layer thus has a relative thickness which acts in combination with the inner, first layer. Furthermore, this thickness already brings about an increase in the mechanical stability of the tube.

The third layer can have a thickness in a range of from 2% to 18%, preferably 10%, relative to the total wall thickness of the tube. An increase in the tensile and bending strength of the tube is brought about by means of this relative layer thickness.

The fourth layer can have a thickness in a range of from 30% to 50%, preferably 40%, relative to the total wall thickness of the tube. This relative layer thickness provides a basic framework for the fluid line which is inexpensive and nevertheless imparts mechanical stability.

The outer, fifth layer can have a thickness in a range of from 12% to 28%, preferably 20%, relative to the total wall thickness of the tube. As a result, the outer protective layer formed by the outer, fifth layer can provide adequate protection against external, in particular chemical, influences for the inner layers, whereby a relatively small amount of material is consumed in comparison with the other layers.

Thus, the outer, fifth layer can additionally, per an embodiment, comprise a color masterbatch. In this way, the outer, fifth layer can be colored. The remaining components of the outer, fifth layer can furthermore additionally be formed by other substances which slightly modify the physical properties of the outer, fifth layer. The fundamental properties of the outer, fifth layer are not substantially modified by the color masterbatch and/or the additives.

Moreover, use of a fluid line in accordance with the above description for conveying fuel in a vehicle is envisaged in order to achieve an object per an embodiment.

The effects and advantages of the use of a fluid line will be apparent from the description of the fluid line presented above.

BRIEF DESCRIPTION OF THE FIGURES

Further features, details and advantages of the disclosure will be apparent from the wording of the claims and from the following description of illustrative embodiments with reference to drawings, in which:

DETAILED DESCRIPTION

Figure 1:
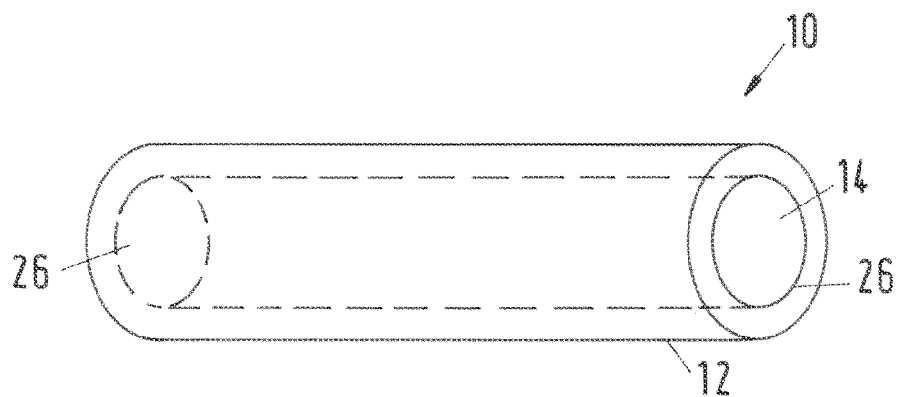
FIG. 1 shows a schematic illustration of a fluid line.
Figure 2:
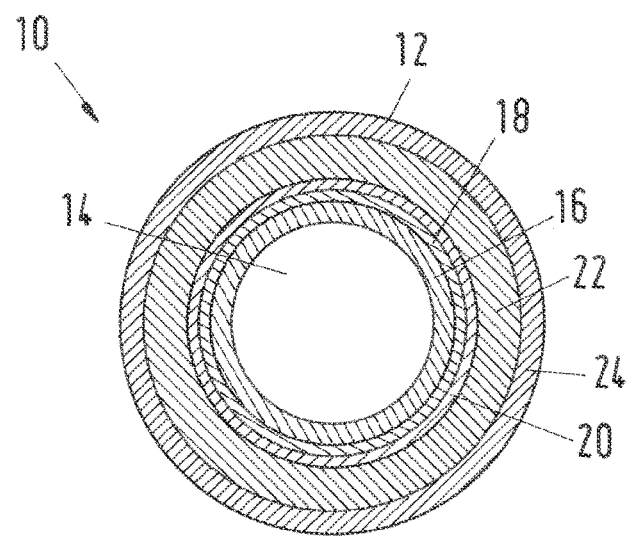
FIG. 2 shows a sectional view through the fluid line from FIG. 1.

FIGS. 1 and 2 illustrate a fluid line 10, which can be a fuel line in a vehicle, for example. In this context, the fuel can contain alcohol or other volatile substances, or aggressive chemicals. The fluid line 10 can form at least a subsection of the fuel line between the fuel tank and the engine of a vehicle.

According to FIG. 1, the fluid line 10 comprises a tube 12 which surrounds an interior space 14. The interior space 14 extends through the entire tube 12 and has through openings 26 at the ends of the tube 12. The tube 12 can be connected to other line elements of the fuel line or to some other line, and the through openings 26 thus form a transition from the interior space to the lumen of other line elements. The fluid to be transferred is then introduced into the interior 14 of the tube 12 through one of the through openings 26 and discharged through the other through opening 26.

The tube 12 is manufactured from a plastics material of multilayered construction. This means that the tube 12 has a tube wall which has various materials in layers.

Here, FIG. 2 shows a cross section through the fluid line 10. In this case, the tube 12 of the fluid line 10 comprises five layers.

The inner, first layer 16 forms the inner wall of the tube 12, which delimits the interior space 14. The inner, first layer 16 comprises polyamide 9T (PA9T). Here, the inner, first layer 16 can be composed entirely of polyamide 9T. The inner, first layer 16 composed of polyamide 9T has low solubility and low permeability for most substances, particularly for plastics and the components and additives thereof. It also forms a barrier against the escape of water. Thus, the inner, first layer 16 forms a barrier against passage of chemical components and furthermore provides protection for the remaining sections of the tube 12, which could be dissolved by the components of the fluid, particularly of fuels.

In the example shown in FIG. 2, the inner, first layer 16 has a thickness which forms 15% to 25% of the total wall thickness of the tube 12.

The second layer 18 comprises polyamide 12 and extends around the inner, first layer 16. The second layer 18 further reduces the escape of water from the inner, first layer 16. Furthermore, the second layer 18 strengthens the mechanical properties of the tube, thus enabling fluids that may be under a high pressure to be transferred through the fluid line 10.

In this example, the second layer 18 has a thickness which forms 12 to 18% of the total wall thickness of the tube 12.

The third layer 20 comprises polyamide 612 and extends around the second layer 18 and thus also around the inner, first layer 16. In this arrangement, the third layer 20 adjoins the second layer 18, when viewed from the interior space 14.

The third layer 20 increases the tensile and bending strength of the tube 12 and, at the same time, is nevertheless strong when wet and flexible. Thus, the third layer 20 further increases the stability of the tube 12.

Here, the third layer 20 in this example has a thickness which forms 2% to 18% of the total wall thickness of the tube 12.

The fourth layer 22 comprises polyamide 6 and, with a layer thickness which, in this example, comprises 30 to 50% of the wall thickness of the tube 12, forms the basic structure of the tube 12. By virtue of the polyamide 6, the fourth layer 22 is mechanically almost as stable as the other layers and, at the same time, is readily available and relatively inexpensive. By combination with the other layers, the costs of the tube can be reduced without accepting trade-offs in the required physical properties.

The fourth layer 22 furthermore extends around the third layer 20 and thus likewise around the second layer 18 and the inner, first layer 16.

The outer, fifth layer 24, like the third layer 20, comprises polyamide 612. The fifth layer 24 extends around the fourth layer 22 and hence around the other layers. It forms the outermost layer of the tube 12 and thus delimits the tube 12 with respect to the environment.

By virtue of the polyamide 612, the outer, fifth layer 24 is insensitive to most substances that are used in a vehicle, for example. Escape of the substances from the corresponding tubes situated thereabove or adjacent thereto and wetting of the outer, fifth layer 24 by these substances therefore has no consequences for the outer, fifth layer 24 that affect the physical properties of the tube 12. The outer, fifth layer 24 thus forms a protective layer for the four inner layers 16, 18, 20 and 22.

The thickness of the outer, fifth layer 24 is 12% to 28% of the wall thickness of the tube 12 in this example. Adequate protection of the inner layers is thereby ensured.

Furthermore, the outer, fifth layer 24 can contain a mixture of polyamide 612 and a color masterbatch. The outer, fifth layer 24 can thus be colored according to the color of the color masterbatch without the physical properties of the polyamide 612 being impaired by the color masterbatch.

In this case, the outer, fifth layer 24 can contain a color masterbatch and/or further additives in addition to the polyamide 612.

The materials of the layers with the layer-thickness proportions are listed in tabular form below. Here, the layer with the number 1 in the table is the inner, first layer 16, and the layer with the number 5 is the outer, fifth layer 24. The layers with the numbers 2, 3 and 4 in the table therefore correspond to layers 18, 20 and 22.

| Layer | Material | Layer distribution |
|---|---|---|
| 1 | PA9T | 20 +/− 5% |
| 2 | PA12 | 10 +/− 8% |
| 3 | PA612 | 10 +/− 8% |
| 4 | PA6 | 40 +/− 10% |
| 5 | PA612 | 20 +/− 8% |
| | Optional color masterbatch | |

In accordance with the layer thicknesses, it is possible to provide a fluid line 10 having a tube 12 in which the inner, first layer 16 has a thickness in a range of from 0.1 mm to 0.3 mm, for example, preferably 0.2 mm, per an embodiment. The second layer 18 can then have a thickness in a range of from 0.01 mm to 0.2 mm, preferably 1 mm, per an embodiment. In this case, the third layer 20 can likewise have a thickness in a range of from 0.01 mm to 0.2 mm, preferably 1 mm, per an embodiment. Furthermore, the fourth layer 22 can have a thickness in a range of from 0.3 mm to 0.5 mm, preferably 0.4 m, per an embodiment. Furthermore, the fifth layer 24 can then have a thickness in a range of from 0.1 mm to 0.3 mm, preferably 0.2 mm, per an embodiment.

The invention is not restricted to one of the above-described embodiments but can be modified in many different ways.

All the features and advantages, including design details, spatial arrangements and method steps, which emerge from the claims, the description and the drawing may be essential to the invention either in themselves or in many different combinations.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE SIGNS 10 fluid line
12 tube
14 interior space
16 inner, first layer
18 second layer
20 third layer
22 fourth layer
24 outer, fifth layer
26 through opening

The invention claimed is:

1. A fluid line having a tube composed of a multilayered plastics material, wherein the tube surrounds an interior space, wherein the tube comprises an inner, first layer composed of polyamide 9T (PA9T), a second layer composed of polyamide 12 (PA12), a third layer composed of polyamide 612 (PA612), a fourth layer composed of polyamide 6 (PA6) and an outer, fifth layer composed of polyamide 612 (PA612), wherein the inner, first layer delimits the interior space.

2. The fluid line as claimed in claim 1, wherein the outer, fifth layer comprises a color masterbatch.

3. Use of a fluid line as claimed in claim 1 for conveying fuel in a vehicle.

4. The fluid line as claimed in claim 1, wherein the inner, first layer, the second layer, the third layer, the fourth layer, and the outer, fifth layer constitute all of the layers of the tube, the tube lacking additional discrete layers.

5. The fluid line as claimed in claim 1, wherein the inner, first layer has a thickness in a range of from 15% to 25% of a wall thickness of the tube.

6. The fluid line as claimed in claim 5, wherein the inner, first layer has a thickness of 20% of a wall thickness of the tube.

7. The fluid line as claimed in claim 1, wherein the second layer has a thickness in a range of from 2% to 18% of a wall thickness of the tube.

8. The fluid line as claimed in claim 7, wherein the second layer has a thickness of 10% of a wall thickness of the tube.

9. The fluid line as claimed in claim 1, wherein the third layer has a thickness in a range of from 2% to 18% of a wall thickness of the tube.

10. The fluid line as claimed in claim 9, wherein the third layer has a thickness of 10% of a wall thickness of the tube.

11. The fluid line as claimed in claim 1, wherein the fourth layer has a thickness in a range of from 30% to 50% of a wall thickness of the tube.

12. The fluid line as claimed in claim 11, wherein the fourth layer has a thickness of 40% of a wall thickness of the tube.

13. The fluid line as claimed in claim 1, wherein the outer, fifth layer has a thickness in a range of from 12% to 28% of a wall thickness of the tube.

14. The fluid line as claimed in claim 13, wherein the outer, fifth layer has a thickness of 20% of a wall thickness of the tube.

15. The fluid line as claimed in claim 1, wherein the inner, first layer constitutes an innermost layer of the tube, and the outer, fifth layer constitutes an outermost layer of the tube.

16. The fluid line as claimed in claim 15, wherein the second layer extends immediately around the inner, first layer, and the third layer extends immediately around the second layer.

17. The fluid line as claimed in claim 16, wherein the fourth layer extends immediately around the third layer, and the outer, fifth layer extends immediately around the fourth layer.

* * * * *